Figure 3:
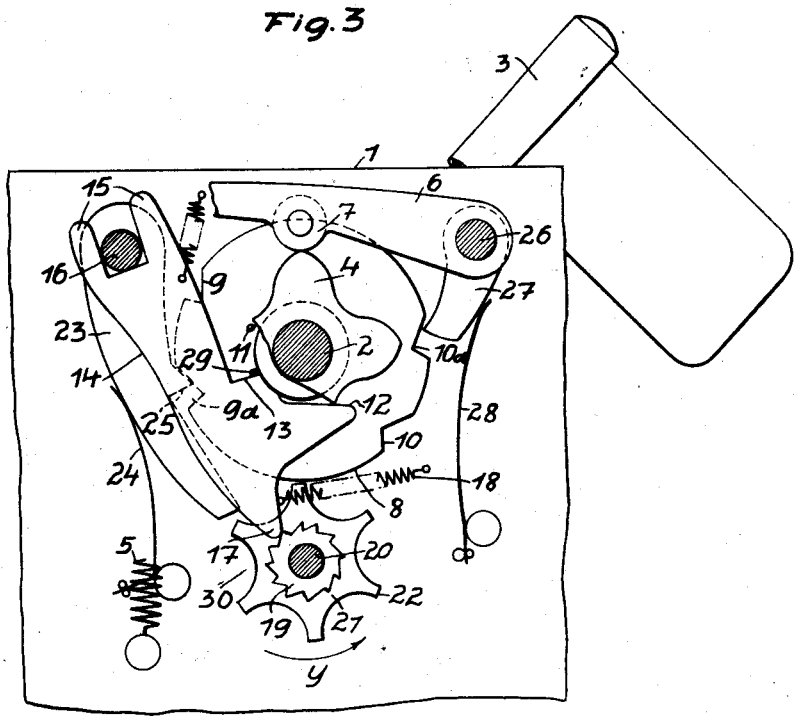

July 22, 1930.  P. RIEGGER  1,771,142
FARE INDICATOR
Filed Nov. 11, 1924  2 Sheets-Sheet 1
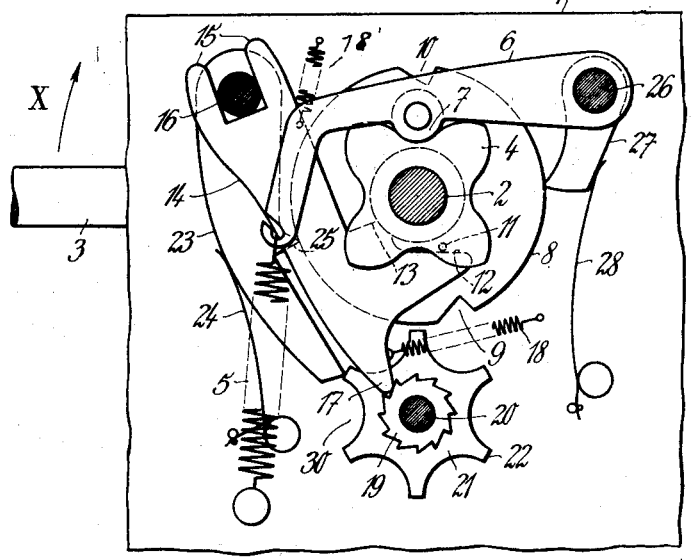
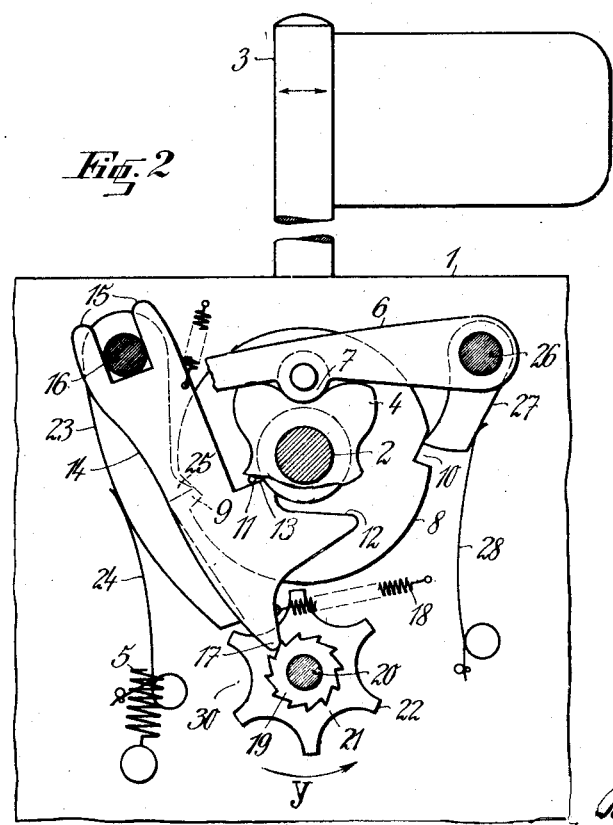
Inventor:
Paul Riegger
by Lotka, Kehlenbeck & Farley
Attorneys July 22, 1930.  P. RIEGGER  1,771,142
FARE INDICATOR
Filed Nov. 11, 1924  2 Sheets-Sheet 2

Inventor:
Paul Riegger
by:
Lorka, Kehlenbeck & Farley
Attorneys.

Patented July 22, 1930

1,771,142

UNITED STATES PATENT OFFICE

PAUL RIEGGER, OF VILLINGEN I. BADEN, GERMANY, ASSIGNOR TO KIENZLE UHREN-FABRIKEN AKTIENGESELLSCHAFT, OF SCHWENNINGEN, A. N., GERMANY, A CORPORATION OF GERMANY

FARE INDICATOR

Application filed November 11, 1924, Serial No. 749,203, and in Germany April 12, 1924.

My invention relates to improvements in fare indicators. At the end of a drive the numeral wheels of a fare indicator are released by rocking a lever carrying a wing from the 270° position into the zero or releasing position, in order to permit the numeral wheels to be automatically returned into initial position by a spring or the like. This movement of the numeral wheels requires a certain time. When again setting the indicator into service position the numeral wheels are locked. Therefore, when rapidly rocking the wing lever from the 270° position to the zero position and back again into service position, the service position is sometimes attained before the numeral wheels have arrived in the zero position. In this case in the service or drive position a value is set which is not the initial value but a higher one, so that the next passenger must pay a higher fare, unless he calls the attention of the driver to the fact that the indicator is not in initial position.

The object of the improvements is to provide a fare indicator in which the movement of the numeral wheels can not be intercepted when thus successively throwing the fare indicator into and out of operation. With this object in view my invention consists in providing an operating mechanism adapted when moving the wing from the 270° position into zero position to release a locking member preventing continued rocking movement of the wing lever but permitting short rocking movements of the wing in the zero position during which said operating mechanism returns the locking member into position ready for action, so that thereafter the wing can be further rocked into another operative position. The time required for the said to and fro movement of the wing in the zero position is sufficient to permit the numeral wheels to move into initial position, so that in the meantime the said wheels can not be intercepted.

For the purpose of explaining the invention an example embodying the same has been shown in the accompanying drawing in which the same reference characters have been used in all the views to indicate corresponding parts. In said drawing, Fig. 1, is an elevation of a part of the fare indicator showing the parts in the 270° position; and Fig. 2, is a similar elevation showing the wing in the releasing position and Fig. 3 is a view in elevation showing the parts in the 45° position.

As shown in the figures, in one of the walls 1 of the casing enclosing the indicator a shaft 2 is rockingly mounted which has a lever 3 carrying a wing secured thereto. The shaft 2 carries a cam disk 4 provided with four cams and four cut-out portions intermediate the said cams. The said cam disk cooperates with an arm 6 rockingly mounted at 26 and acted upon by a spring 5 tending to pull the same downwardly. The arm shows a lug 7 adapted to engage in the cut-out portions of the cam disk 4 holding the wing lever 3 in one of four positions. That is to say the cut-out portions of the cam disk 4 correspond in number to the positions occupied by the flag lever 3 and in co-operation with the lug 7 and arm 6 serve to lock said lever in any one of said positions against unintentional displacement.

To the shaft 2 a disk 8 is secured which is formed at its periphery with two notches 9 and 10, and which has a pin 11 secured thereto. In the path of the said pin there are two shoulders 12 and 13 of an arm 14 engaging with its bifurcated end 15 a pin 16 fixed to the wall 1 of the casing. Due to the slotted engagement of the lever 14 with the pin 16 this lever is capable of both swinging and longitudinal movement. The opposite end of the said lever is in the form of a pawl 17 adapted for engagement with the teeth of a ratchet wheel 19 mounted on a shaft 20, a spring 18 tending to hold the pawl 17 in engagement with the ratchet wheel 19, and a second spring 18' tending to draw the lever 14 upward. The ratchet wheel 19 is connected with a locking disk 21 having teeth 22 and intermediate cut-out portions 30. The teeth 22 are adapted for cooperation with a pawl 23 rockingly mounted on the pin 16 and acted upon by a spring 24 and having a nose 25 at the side adjacent to the disk 8 arranged to co-operate with the notch 9 of the disk 8 to lock the same against clockwise movement.

On the bolt 26 a pawl 27 is mounted which is held by a spring 28 in engagement with the periphery of the disk 8 and co-operates with the notch 10 to arrest a counter-clockwise movement of the disk 8. It will be understood that the relative position of the notches 9 and 10 with respect to the co-operating nose 25 and pawl 27 is such that a slight lost motion is possible in the disk relatively to the nose 25 and pawl 27 as indicated in Fig. 2 by the spaces between the radial walls of said notches and the nose and pawl respectively. The disk 8 is thus capable of a slight reciprocating rocking movement for the purpose to be more fully set forth hereinafter.

The operation of the mechanism is as follows: When rocking the wing lever 3 from the 270° position shown in Fig. 1 in the direction of the arrow $x$ and into the zero position shown in Fig. 2 the pin 11 engages the shoulder 12 and forces the arm 14 with the pawl 17 downwardly. Thereby the sprocket wheel 19 and the locking disk 21 are turned in the direction of the arrow $y$, so that the tooth 22 of the locking disk supporting the lever 23 releases the said lever which is therefore forced inwardly and towards the disk 8 by the spring 24. Shortly before the releasing position is attained by the wing lever 3 the nose 25 of the lever 23 engages in the notch 9 and thereafter permits only a slight movement of the wing lever beyond the releasing position corresponding to the aforesaid lost motion, but locks the disk as against further movement of the wing lever in a clockwise direction.

If now the wing lever 3 is rocked counter-clockwise to an extent corresponding to the previously mentioned lost motion existing between the disk 8 and pawl 27, the pin 11 which in the releasing position of the wing is in the position shown in Fig. 2 engages the shoulder 13 and thus shifts the arm 14 downwardly. Thereby the mechanism 17, 19 is advanced one step, this rocking or oscillation of the wing lever 3 being repeated in order to advance the mechanism in successive steps. The extent of the return movement or oscillation of the wing lever 3 is determined by the pawl 27 striking on the shoulder provided by the notch portion 10.

By advancing the sprocket wheel 19 in the indicated manner the locking disk 21 is also rotated, so that finally the next succeeding tooth 22 of the locking disk 21 engages the front face of the pawl 23 and rocks the same to the left and away from the disk 8. This operation lifts the nose 25 out of the notch 9 so that the wing 3 is again released and is now capable of being shifted to a service position.

The extent of the locking and unlocking movements of the elements can be made such that the wing lever is released either after one reciprocating movement or after several such movements as in the illustrated example. After releasing the wing lever 3 the tooth 22 of the disk 21 which engages the pawl 23 holds the said pawl in the position ready for action while the wing lever is rocked from the zero position to the 270° position, and it releases the same only in the manner described after the wing lever has passed beyond the 270° position, so that it can be moved by the spring 24 into locking position.

In other words as long as the nose 25 remains in the notch 9 it is impossible to adjust the wing lever 3 in a clockwise direction from the upright out of service position shown in Fig. 2 to a service position at an angle thereto, this setting of said lever being possible only after it has first been given one or more initial movements in a counter-clockwise direction. The indicating mechanism can therefore be adjusted to a new service position only after it has been properly reset to the zero position subsequent to a previous indicating operation.

When for any reason the fare-indicating disks require an unusually long period of time to revolve to their zero position, the delay effected by the locking mechanism when the wing lever is in zero position may not be sufficient to permit such disks to be returned to their zero position. In such cases I provide a second pin 29 repeating the locking operation between zero and 90°, for example in the 45° position as indicated in Fig. 3. The disk 8, upon which the pin 29 is fixed, is provided with a second pair of notches 9ª, 10ª, similar to the notches 9, 10, but spaced 45° to the rear thereof. The pin 29 is similarly spaced 45° from the pin 11. As will be clear from Fig. 3, when the wing lever 3 is in the 45° position the pin 29 is directly in front of the shoulder 13, while the nose 25 is engaged in the notch 9ª and operates to prevent further clockwise movement of the lever 3. As in the zero position, the lever 3 must be moved counterclockwise before the nose 25 has been moved out of the notch 9ª by the engagement of a tooth 22 of the disk 21 with the pawl 23.

It will be understood that the adjustments of the wing lever 3, excepting for the releasing movements above set forth, are always in a clockwise direction to set the indicating mechanism successively in service and out of service positions. For this reason it is not necessary to lift the pawl 27 away from the disk 8 as said pawl simply rides out of the notches 10 and 10ª as the disk 8 partakes of the clockwise movement of the wing lever 3. The operative steps that take place when the flag is moved from the zero position shown in Fig 2 to the 45° position shown in Fig. 3 are as follows: The flag 3 is moved repeatedly toward the left by the driver in order to release the same. The pin 11 acting against the shoulder 13 presses the arm 14 downward, thereby moving the ratchet wheel 19 in the direction of the arrow by means of the pawl 17. The locking disk 21 thereupon assumes a position corresponding to that shown in Fig. 1 in which the next tooth 22 engages and moves the pawl 23 out of its locking position by swinging the nose 25 out of engagement with the notch 9. The driver then rotates the flag to the right (clockwise) toward the position shown in Fig. 3. The pin 29, during this movement, acts against the shoulder 12 and causes the arm 14 to rotate ratchet wheel 19 counterclockwise sufficiently to effect release of the pawl 23 from the tooth of locking disk 21 engaging the same. When the parts reach the position shown in Fig. 3, the nose 25 is free to enter the notch 9ª and thus prevent further clockwise rotation of the flag 3. The driver must now move the flag repeatedly toward the left. During this oscillation, the pin 29 engages the shoulder 13 and presses the arm 14 downward. The wheel 19 and disk 21 are then operated as before until a tooth 22 swings the pawl 23 to effect disengagement of the notch 9ª by the nose 25, whereupon the flag is moved clockwise to the first fare position.

I claim:

1. In a fare indicator, the combination, with a rotary operation member for the indicator mechanism, of a locking member for said operating member adapted to interrupt the movement of the operating member when moving the same from the 270° position into the zero position, and means including a ratchet wheel and a stop wheel and controlled by said operating member for throwing said locking member out of locking position.

2. In a fare indicator, the combination, with a rotary operating member for the indicator mechanism, of a locking member for said operating member adapted to interrupt the movement of the operating member when moving the same from the 270° position into the zero position and to permit limited rocking movement of said operating member, and means including a ratchet wheel and a stop wheel and controlled by the rotary and reciprocating movements of the operating member for throwing said locking member out of locking position.

3. In a fare indicator, the combination, with a rotary operating member for the indicator mechanism, of a locking member for said operating member adapted to interrupt the movement of the operating member when moving the same from the 270° position into the zero position and to permit limited rocking movement of said operating member, a pawl and ratchet mechanism controlled by the rotary and reciprocating movements of the operating member, and means connected with said pawl and ratchet mechanism for throwing said locking member out of locking position.

4. In a fare indicator, the combination, with a rotary operating member for the indicator mechanism, of a locking member for said operating member adapted to interrupt the movement of the operating member when moving the same from the 270° position into the zero position and to permit limited rocking movement of said operating member, a pawl and ratchet mechanism, the pawl being formed with two shoulders, a device movable with said operating member and adapted respectively upon movement of the operating member in opposite directions to engage said shoulders for imparting operative movements to the pawl, and a member connected with said pawl and ratchet mechanism and adapted to throw said locking member out of operation.

5. In a fare indicator, the combination, with a rotary operating member for the indicator mechanism, of a locking member for said operating member adapted to interrupt the movement of the operating member when moving the same from the 270° position into the zero position and to permit limited rocking movement of said operating member, a pawl and ratchet mechanism controlled by the rotary and reciprocating movements of the operating member, and a star wheel connected with said pawl and ratchet mechanism and adapted to throw said locking member out of operation.

6. In a fare indicator, the combination, with a rotary operating member for the indicator mechanism, of a locking member for said operating member adapted to interrupt the movement of the operating member when moving the same from the 270° position into the zero position and to permit limited rocking movement of said operating member, a pawl and ratchet mechanism, the pawl being formed with two shoulders, a device movable with said operating member and adapted respectively upon movement of the operating member in opposite directions to engage said shoulders for imparting operative movements to the pawl, and a star wheel connected with said pawl and ratchet mechanism and adapted to throw said locking member out of operation.

7. In a fare indicator, the combination, with a rotary operating member for the indicator mechanism, of a locking member for said operating member adapted to interrupt the movement of the latter in two successive positions thereof and to permit limited rocking movement of said operating member in such positions, a pawl and ratchet mechanism, the pawl being formed with two shoulders, two devices movable with said operating member and adapted respectively upon movement of the operating member in opposite directions, in said successive positions of such member, to engage said shoulders for imparting operative movements to the pawl, and a member connected with said pawl and ratchet mechanism and adapted to throw said locking member out of operation.

In testimony whereof I hereunto affix my signature.

PAUL RIEGGER.